United States Patent
Chan

(10) Patent No.: US 12,479,049 B2
(45) Date of Patent: Nov. 25, 2025

(54) SYSTEM AND METHOD TO MEASURE AND CALIBRATE LASER PROCESSING MACHINE USING LOW-POWER BEAM PROFILER

(71) Applicant: II-VI Delaware, Inc, Wilmington, DE (US)

(72) Inventor: Danny Chan, Berlin (DE)

(73) Assignee: II-VI DELAWARE, INC., Wilmington, DE (US)

( * ) Notice: Subject to any disclaimer, the term of this patent is extended or adjusted under 35 U.S.C. 154(b) by 953 days.

(21) Appl. No.: 17/452,320

(22) Filed: Oct. 26, 2021

(65) Prior Publication Data

US 2023/0130740 A1   Apr. 27, 2023

(51) Int. Cl.
*B23K 26/70* (2014.01)
*B23K 26/04* (2014.01)
*B23K 26/06* (2014.01)

(52) U.S. Cl.
CPC .......... *B23K 26/705* (2015.10); *B23K 26/043* (2013.01); *B23K 26/048* (2013.01); *B23K 26/0648* (2013.01); *B23K 26/707* (2015.10)

(58) Field of Classification Search
CPC .. B23K 26/042; B23K 26/043; B23K 26/048; B23K 26/0648; B23K 26/705; B23K 26/707
USPC ..................................................... 219/121.83
See application file for complete search history.

(56) References Cited

U.S. PATENT DOCUMENTS

2007/0145025 A1*   6/2007   Yamazaki ............ B23K 26/043
                                                           219/121.74
2021/0109341 A1*   4/2021   Bae ....................... G02B 7/1827

FOREIGN PATENT DOCUMENTS

| DE | 102008027524 B3 | 9/2009 |
| DE | 102012001609 B3 | 2/2013 |
| EP | 3517241 A1 | 7/2019 |
| JP | H02108487 A | 4/1990 |
| JP | H09103896 A | 4/1997 |

* cited by examiner

*Primary Examiner* — Chris Q Liu
*Assistant Examiner* — James F Sims, III
(74) *Attorney, Agent, or Firm* — Blank Rome LLP

(57) ABSTRACT

An apparatus calibrates a laser processing machine and includes an imaging sensor and a controller. The controller directs output of a beam from the machine's low power pointer laser and directs an actuator at measurement conditions. Images of the beam are obtained by an imaging sensor, and the controller measures a parameter of at least one of the machine's optical components. The controller then outputs an indication of the machine indicative of the measured parameter. For example, the controller can calculate a focus position of the beam from the laser head so the Z-position of the laser head can be adjusted for any discrepancies. In other examples, the controller can determine an offset of the fiber tip of the head so adjustments to operations can be made, or the controller can determine centering of the beam in the head's nozzle so adjustments can be made.

23 Claims, 7 Drawing Sheets

SYSTEM AND METHOD TO MEASURE AND CALIBRATE LASER PROCESSING MACHINE USING LOW-POWER BEAM PROFILER

BACKGROUND OF THE DISCLOSURE

Several parameters of a laser head for a laser processing machine, such as a flatbed cutting machine, can benefit from being monitored. A change in some of these parameters can affect calibration of the laser head. Typically, parameters of a laser head can be measured using a high-power beam profiler. Unfortunately, the high-power beam profiler is typically only used during the assembly of the machine because the high-power beam profiler is very expensive equipment and requires a considerable amount of space.

The subject matter of the present disclosure is directed to overcoming, or at least reducing the effects of, one or more of the problems set forth above.

SUMMARY OF THE DISCLOSURE

An apparatus disclosed herein is used for calibrating a laser processing machine. The machine has a laser source, a laser head, at least one optical component, and machine actuators such that the machine actuators include at least one device actuator and at least one head actuator. The at least one device actuator is configured to position the laser head. The at least one optical component is associated with the laser head, and the at least one head actuator is configured to adjust the at least one optical component.

The apparatus comprises an imaging sensor and a controller. The imaging sensor is configured to image an optical beam of the laser source from the laser head. The controller is in operable communication with the imaging sensor and with at least one of the machine actuators. The controller is configured to: control output of the optical beam from the laser head; control the at least one machine actuator at a plurality of measurement conditions relative to the imaging sensor; obtain a plurality of images of the optical beam at the plurality of measurement conditions from the imaging sensor; measure at least one parameter of the laser processing machine based on the obtained images; and output at least one indication of the laser processing machine indicative of the at least one parameter.

A system is used for calibrating a laser processing machine that has a low power pointer laser and at least one device actuator. The system comprises a laser head being movable by the at least one device actuator and being configured to emit an optical beam of the low power pointer laser. The laser head has at least one head actuator and has at least one optical component. The at least one head actuator is configured to adjust the at least one optical component. The system also comprises an apparatus having an imaging sensor and a controller as disclosed above for calibrating the laser processing machine.

A laser processing machine is disclosed that comprises a laser source, at least one device actuator, a laser head, at least one optical component, and at least one head actuator. The laser source has a high-power processing laser (22) and a low power pointer laser (24). The laser head is movable by the at least one device actuator and is configured to emit an optical beam of the laser source. The at least one head actuator is associated with the laser head and is configured to adjust the at least one optical component. Finally, the machine comprises an apparatus having an imaging sensor and a controller as disclosed above for calibrating the laser processing machine.

A method is disclosed herein for calibrating a laser processing machine. The method comprises: controlling output of an optical beam of a low power pointer laser from a laser head of the laser processing machine; controlling at least one machine actuator associated with the laser processing machine at a plurality of measurement conditions; obtaining, with an imaging sensor, a plurality of images of the optical beam at the plurality of measurement conditions; measuring at least one parameter of the laser processing machine based on the obtained images; and outputting at least one indication of the laser processing machine indicative of the at least one parameter.

The foregoing summary is not intended to summarize each potential embodiment or every aspect of the present disclosure.

DETAILED DESCRIPTION OF THE DISCLOSURE

Figure 1:
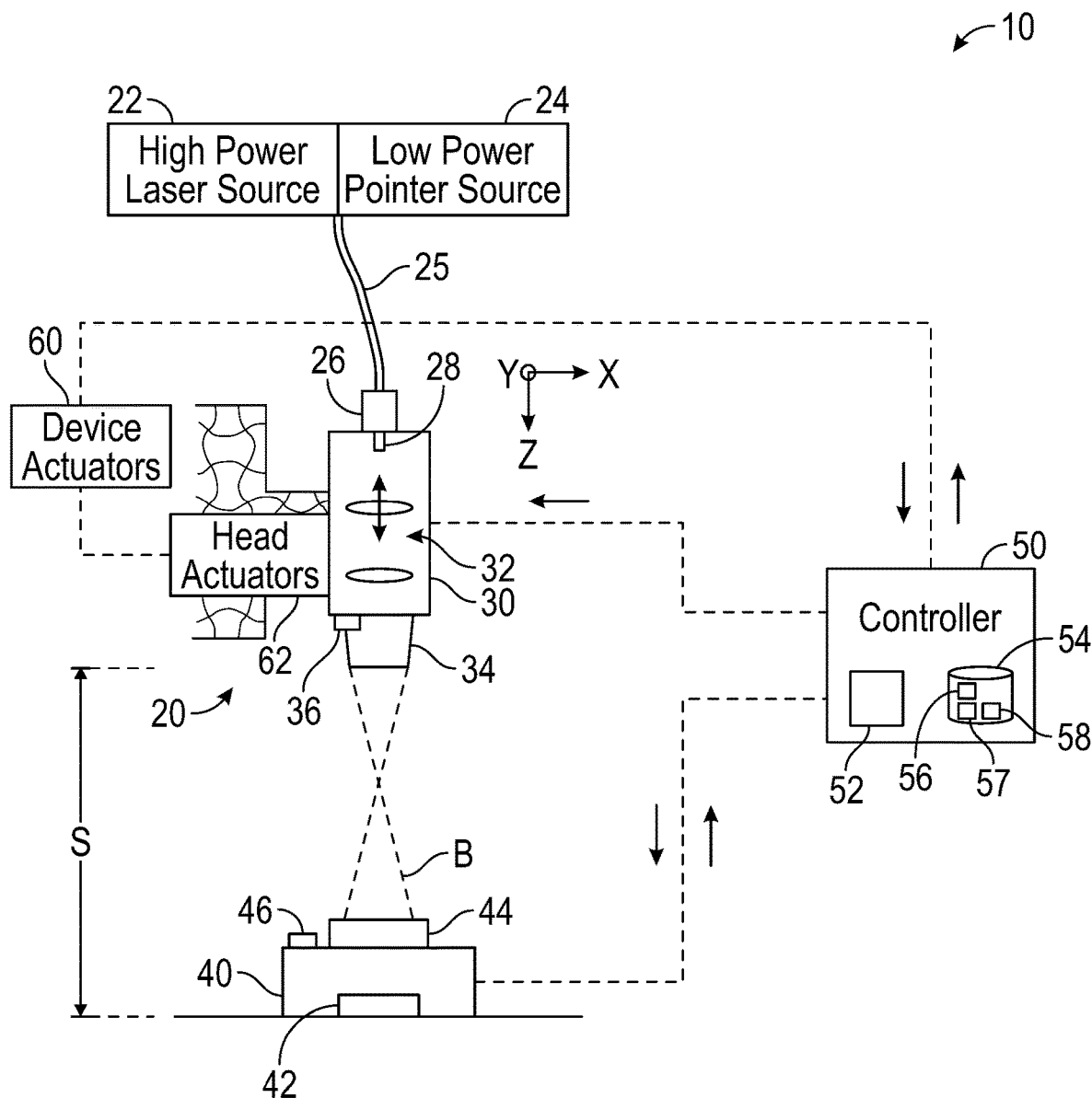
FIG. 1 illustrates a schematic of a laser processing machine according to the present disclosure.

FIG. 1 illustrates a schematic of a laser processing machine 10 according to the present disclosure. The machine 10 includes a positioning device 20, a high-power laser source 22, a low-power pointer laser source 24, a laser head 30, and positioning actuators 60, 62. The positioning device 20 includes one or more of the positioning or device actuators 60 to move/position the laser head 30 relative to workpieces. For example, the positioning device 20 can be a gantry or robotic arrangement. The one or more device actuators 60 associated with the positioning device 20 and having algorithmic controls can move/position the laser head 30 in one or more axes (X, Y, Z). The positioning of the laser head 30 as well as the control of the one or more device actuators 60 are some of the components and aspects of the machine 10 that can be measured and calibrated according to calibration procedures discussed below.

The laser head 30 has a number of components, including a fiber tip 28, optics 32, a nozzle 34, and a sensor arrangement 36. The one or more of the positioning or head actuators 62 can move/position components of the laser head 30. For example, the optics 32 inside the head 30 can include lens elements, reflectors, and the like, which can be moved/positioned by the one or more head actuators 62 associated with the laser head 30 to modify an optical beam. For instance, the laser head 30 may have zoom functionality with appropriate actuators 62 associated with the laser head 30 to move one or more lens elements of the optics 32 inside the head 30. These and a number of other configurations are possible. The positioning of the fiber tip 28, the optics 32, and the nozzle 34 as well as the control of the one or more head actuators 62 are also components and aspects of the machine 10 that can be measured and calibrated according to calibration procedures discussed below.

The machine 10 further includes a controller 50 having a processing unit 52 and memory unit 54, which can include any suitable hardware and software known and used in laser processing operations. For example, the controller 50 can be a programmable logic controller. The controller 50 can be separate from an existing control unit for the machine 10, the positioning device 20, and the head 30. As such, the controller 50 may be configured to interface with the existing configuration. Alternatively, the controller 50 may be integrated into the machine 10 and its components so the controller 50 can execute calibration procedures in addition to executing standard operational procedures, such as procedures for cutting workpieces. In fact, any one of the positioning device 20, the head 30, and the imaging module 40 can have processing capabilities to run algorithms and control features as appropriate. Therefore, features of the controller 50 can be shared among the components of the machine 10.

Either way, the controller 50 can be a module integrated into the machine 10, or the controller 50 can be a stand-alone module, which can be added to an existing machine 10. The controller 50 can be connected to or can include the computerized numerical controls for the machine 10. A communication protocol can be used between the computerized numerical controls and the positioning actuators 60, 62 of the machine 10, device 20, and head 30 so that the controller 50 can trigger appropriate movements, and the machine 10 can signal in-position events.

As noted above, the machine 10 can include a flatbed cutting machine. During cutting operations, the laser head 30 can be moved relative to workpieces to be processed, cut, etc. using the positioning device 20, such as the gantry or robotic system. For example, the one or more device actuators 60 can move the laser head 30 at least along a Z-axis relative to other components of the machine 10, such as the flatbed for supporting workpieces to be cut. Positioning by the one or more device actuators 60 is controlled based on control algorithms (e.g., the device's positioning algorithms 56) so the operation can be executed precisely. A sensor arrangement 36 on a nozzle 34 of the head 30 can measure a distance relative to the workpiece. For example, the sensor arrangement 36 can use conductive sensing to determine a stand-off of the nozzle 34 of the head 30 from a workpiece.

Optical power from the high-power laser source 22 is directed by a fiber cable 25 to a coupling 26 on the laser head 30. The optical power is emitted into the laser head 30 from a fiber tip 28, and the optics 32, such as lens optics 33a and the like, direct (focus, magnify, etc.) the laser beam B from the nozzle 34 on the laser head 30. The one or more head actuators 62 can move/position the optics 32 of the head 30 to adjust magnification, focus, etc. Parameters of these one or more head actuators 62 are controlled based on control algorithms (e.g., the head's optics algorithms 58) so the operation can be executed precisely. The optics algorithms 58 controls the head actuators 62 to change the operational parameters required to complete the laser process during a cutting operation of the machine 10. In fact, this algorithm can run on a processing unit (not shown) of the head 30. According to the present disclosure, corrections are calculated for design parameters that are not at their designed values due to differences in mechanical tolerances, environmental factors, or the like. The optics algorithms 58 can be used to correct certain ones of the design parameters for errors caused by optomechanical tolerances. For example, the optics algorithms 58 can be used to correct for a mismatch of actual (MZ) spot parameters from requested spot parameters.

From time to time during operation, it is useful to be able to calibrate or to check the machine 10 so it can operate with precision. For example, a service operation is one particular situation when the calibration and check can be performed because the fiber cable 25 or the head 30 may be exchanged for service. The controller 50 is used in conjunction with an imaging module 40 and with other parts of the machine 10 to perform a number of different types of calibration procedures, as discussed below.

The controller 50 is in operable communication with the imaging module 40 and the positioning device 20, the positioning actuators 60, 62, and the like and can perform calibration procedures. In one arrangement, the controller 50 can give low-level commands directly to the device actuators 60. This direct arrangement may be used when the controller 50 is embedded in the machine's architecture. In another arrangement, the controller 50 can trigger high-level commands (e.g., "move to position over imaging module 40"), and the machine 10 can then execute the appropriate actions. This indirect arrangement may be used when the controller 50 is not embedded in the machine's architecture.

Briefly, the controller 50 directs output of the pointer beam from the low-power pointer laser source 24 and the laser head 30 and directs the positioning actuators 60, 62 at a plurality of measurement conditions relative to the imaging module 40. The controller 50 obtains images of the beam B acquired by the imaging module 40 at the plurality of measurement conditions. For example, the controller 50 can communicate control signals to the one or more device actuators 60 of the positioning device 20 to set the Z-position of the laser head 30 relative to the imaging module 40, and the controller 50 can communicate control signals to the one or more head actuators 62 to set zoom of the optics 32 in the head 30. The controller 50 can also communicate a trigger signal to the imaging module 40 to trigger acquisition of image data. The imaging module 40 can return the image data to the controller 50 for analysis. Likewise, the imaging module 40 may have some integrated processing capabilities to do analysis of the image data itself.

The controller 50 measures at least one parameter or offset of at least one component of the machine 10 based on the obtained images. Based on the measurements, the controller 50 outputs at least one indication or adjustment of the component that is indicative or corrective of the at least one parameter or offset. The adjustment of the component can include: adjusting the position of the head 30 by the one or more device actuators 60 and/or the device's positioning algorithms 56; adjusting the position of the optics 32 by the one or more head actuators 62 and/or the head's optics algorithms 58; adjusting the position of the fiber tip 28; adjusting the position of the nozzle 34; adjusting other optical or mechanical elements of the head as needed; or adjusting another component of the machine 10. If the controller 50 is integrated with the machine 10, for example, the controller 50 can adjust the positioning and optics algorithms 56, 58 used in the operation of the machine 10. This can allow for automated adjustments to be implemented. Otherwise, the controller 50 may output information to be implemented manually or separately on the machine 10.

In general, the imaging module 40, which can include a digital camera, is configured to image the optical beam B from the laser head 30 during the calibration procedures. Preferably, the imaging module 40 images the pointer beam B from the low-power pointer source 24 of the machine 10, but the system can use the high power laser 22 of the machine 10. The low-power pointer laser source 24 transmits the pointer beam B through head 30 to the imaging module 40. This allows the imaging module 40 to be low-power to observe the low power pointer laser, which simplifies the arrangement.

The imaging module 40 includes a sensing element 42, which can include any suitable light sensor, such as a charge-coupled device, a CMOS sensor, etc. A filter (not shown) can be used to attenuate the pointer beam B if necessary, and the imaging module 40 can use a singlet lens or other lens arrangement (not shown) for imaging. Further still, the imaging module 40 may not use a lens arrangement if geometry allows. For example, a measurement can be performed with the Z-focus of the head 30 moved outside of the nozzle 34 and/or with the nozzle 34 removed. Depending on the geometry, this focus position can be moved to a position lower than the image sensor 42. In this way, an autofocus procedure can be used so image data can be acquired without any auxiliary optics included in the imaging module 40. Because the imaging module 40 can be integrated into a flatbed cutting machine 10, a motorized shutter 44 may be used to protect the imaging sensor 42, filter, lens, and the like and to avoid contamination when not in use.

From the images, the controller 50 measures values with respect to the beam B from the low-power pointer laser source 24. As will be appreciated, the magnitudes, wavelengths, power distribution, and other characteristics for the pointer laser source 24 are different than those associated with the high-power laser source 22 used during operations. However, appropriate mathematical adjustments and correlations can account for differences between the laser sources 22, 24. In this way, the calibration procedures that uses the low-power measurements can be extended to account for the magnitude, wavelength, power distribution, etc. associated with the low-power pointer laser source 24 and can calculate corrections that can be used for the high-power laser source 22. Another possible way to deal with the data is to only record changes from the first time usage in circumstances where the machine 10 and the processes are confirmed to work by qualified staff. For example, the data can be analyzed by some machine learning algorithm to look for anomalies.

A conductive element or other mechanical feature 46 on the imaging module 40 can also be provided to be used in conjunction with the sensor 36 on the laser head 30 as discussed below. The conductive element 46, for example, can be disposed on the housing of the imaging module 40 and can be set at a known, fixed distance to the sensing element 42 along the Z-axis. This conductive element 46 is metallic and grounded to the same potential as workpieces to be cut. During the calibration procedures, the controller 50 can use an existing distance measurement algorithm 57 to measure the Z-position of the head's sensor 36 from the conductive element 46 in the same way used during cutting operations to measure an absolute position of the laser head 30 from a workpiece. In this way, controller 50 can measure the stand-off S of the head 30 from the sensing element 42 so the measurement can be used to determine both the nozzle position and the focus position during the calibration process. These measurements and positions can be used to correct for mechanical tolerances of the optics (32), the nozzle (34), or any mechanics underneath the focusing lens on the head 30.

Figure 2:
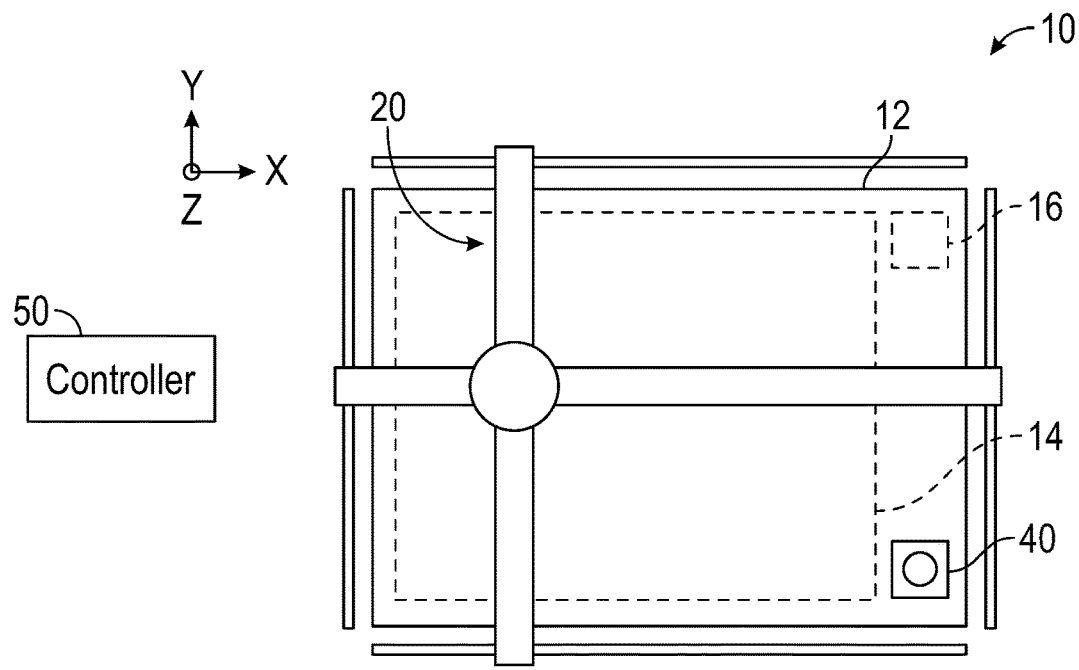
FIG. 2 illustrates a plan view of components of the disclosed machine as a flatbed cutting machine.

The components of the disclosed machine 10 can be used for a number of different laser processing arrangements—one of which is a flatbed laser cutting machine 10 as noted above. For example, FIG. 2 illustrates a plan view of components of the disclosed machine 10 implemented as part of a flatbed cutting machine. In this example, the positioning device 20 includes a gantry system to move the laser head 30 relative to workpieces (not shown) in a working area 14 of a machine surface or table 12. The imaging module 40 can be disposed on the machine surface 12 outside the working area 14 so calibration procedures can be performed from time-to-time. The laser head 30 can be moved by the gantry system 20 to a calibration area outside the working area 14 in much the same way as the head 30 can be moved to a nozzle changing area 16 if present.

In the present arrangement, the laser head 30 is moved relative to the workpiece. Thus, the gantry system 20 moves the laser head 30 relative to the workpiece. Typical movement is in two axes (X, Y) to process the workpiece, but additional movement in a tangent axis (Z) is used for positioning the head 30 at different stand-offs from the workpiece, as may be needed during processing.

Configurations other than a flatbed cutting machine 10 that moves the head 30 relative to the workpiece are possible. Briefly, the laser beam from the laser head 30 may be moved using scanning optics, such as a mirrors driven by galvanometer drives, to steer the emitted laser beam. Also, the workpiece can be moved using a movable table, robotic arm, or the like relative to the laser head 30, which can be maintained in a fixed position. Each of these and combinations of them can benefit from the calibration procedures of the present disclosure. For each of these, a known, measurable, and adjustable standoff S from the laser head 30 to the imaging module 40 is used in the calibration procedures, as disclosed herein.

Figure 3:
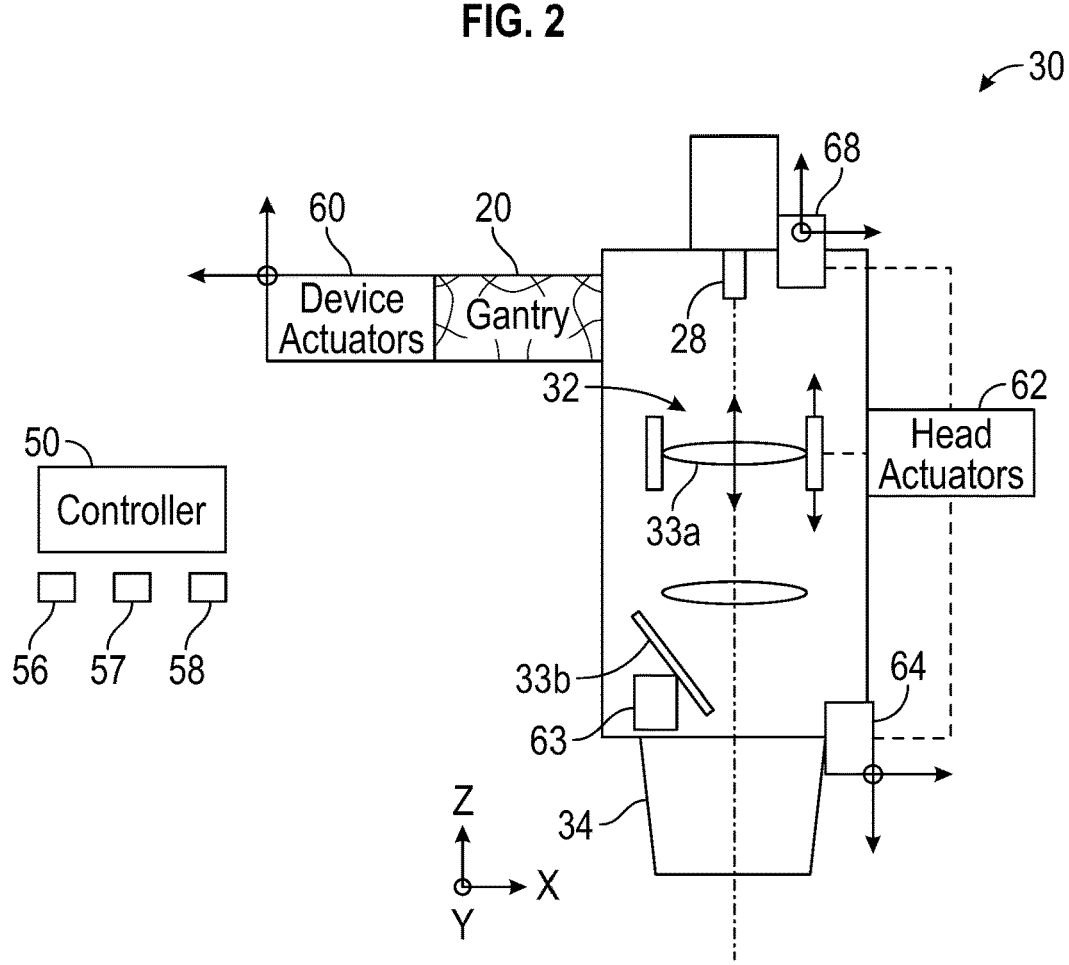
FIG. 3 illustrates a schematic of a laser head for the disclosed machine.

Before turning to examples of calibration procedures, discussion turns to FIG. 3, which illustrates a schematic of a laser head 30 for the disclosed machine 10. As already noted, the laser head 30 includes optics 32. The optics 32 are only schematically shown and can include any suitable optical system. For example, the optics 32 can have one or more lens optics 33a, one or more of which may be movable in any one or more axes. The optics 32 can include one or more mirrors 33b, reflectors, and the like, one or more of which may be movable in any one or more axes. The optics 32 direct the laser beam B from the fiber tip 28 out the nozzle 34 of the laser head 30. As is customary, the nozzle 34 can direct purge gas to the process area of the laser beam and can protect the optics 32 of the laser head 30 from contamination and the like.

The device's positioning algorithm 56 is used to position the laser head 30 using the one or more device actuators 60 in one or more axes (x, y, z) so the laser beam B can be directed precisely. Additionally, the optics algorithms 58 are used to position the internal optics 32 using the one or more head actuators 62 to set the focus, magnification, etc. of the laser beam B precisely. The actuators 60, 62 for the control algorithms 56, 58 may be included on the positioning device 20 and the head 30 or may be associated with the other parts of the machine 10 to make the adjustments in the position as needed.

In addition to these, the laser head 30 may be capable of manual or automatic adjustment to the position of the fiber tip 28 in any one or more axes (x, y, z). As such, the laser head 30 can include a fiber actuator 68 to adjust the position of the fiber tip 28 in any one or more axes (x, y, z). Adjustments to the fiber tip 28 in the one or more axes (x, y, z) can calibrate the laser head 30 and compensate for differences in tolerances and the like. Furthermore, the laser head 30 may be capable of manual or automatic adjustment to the position of the nozzle 34 in any one or more axes (x, y, z). As such, the laser head 30 can include a nozzle actuator 64 to adjust the position of the nozzle 34 on the head 30. Adjustments to the nozzle 34 in the one or more axes (x, y, z) can center passage of the laser beam in the nozzle 34 and compensate for differences in tolerances and the like. Moreover, in many instances, the laser head 30 includes a mirror 33b or other reflector, which directs the laser beam and can be movable. For example, the laser beam in the laser head 30 may be directed by a tiltable mirror 33b that is moved by at least one mirror actuator 63. In another example, the laser beam in the laser head 30 may be directed by a deformable mirror 33b that can have its shape changed by at least one mirror actuator 63. Adjustments to the mirror 33b in the one or more axes (x, y, z) can calibrate the laser head 30 and compensate for differences in tolerances and the like.

The adjustment actuators 64, 68 can be automated devices and can be connected to existing hardware, which is already available on the head 30 for making manual adjustments. Alternatively, the adjustment actuators 64, 68 as automated devices can be integrated directly into the head 30. Finally, one or more lens optics 33a or other element of the optics 32 inside of the head 30 can be moved in one or more of X, Y, and Z directions by the head actuators 62 to account for offset of the nozzle 34, for offset of the fiber tip's position, or for adjustment purposes.

One calibration procedure that can be implemented with the disclosed machine 10 involves calibrating the focus position of the laser beam B from the laser head 30. The procedure 100 in FIG. 4A-4B determines a virtual Z-position of the fiber tip 28 for the laser head 30 having zoom optics 32 so operation can be calibrated. The controller 50 measures the beam caustics by moving the head 30 to different Z-positions along the Z-axis and measures the spot size at the imaging module 40. The actual Z-position of the laser beam's focus is then compared to an expected position for several magnifications and Z-positions. This comparison gives the Z-position offset of the fiber tip 28 between where the fiber tip 28 is actually positioned and where the fiber tip 28 is expected to be positioned during control operations. This offset is used to calibrate the head 30, the optics 32, and their control during operation.

Figure 4A:
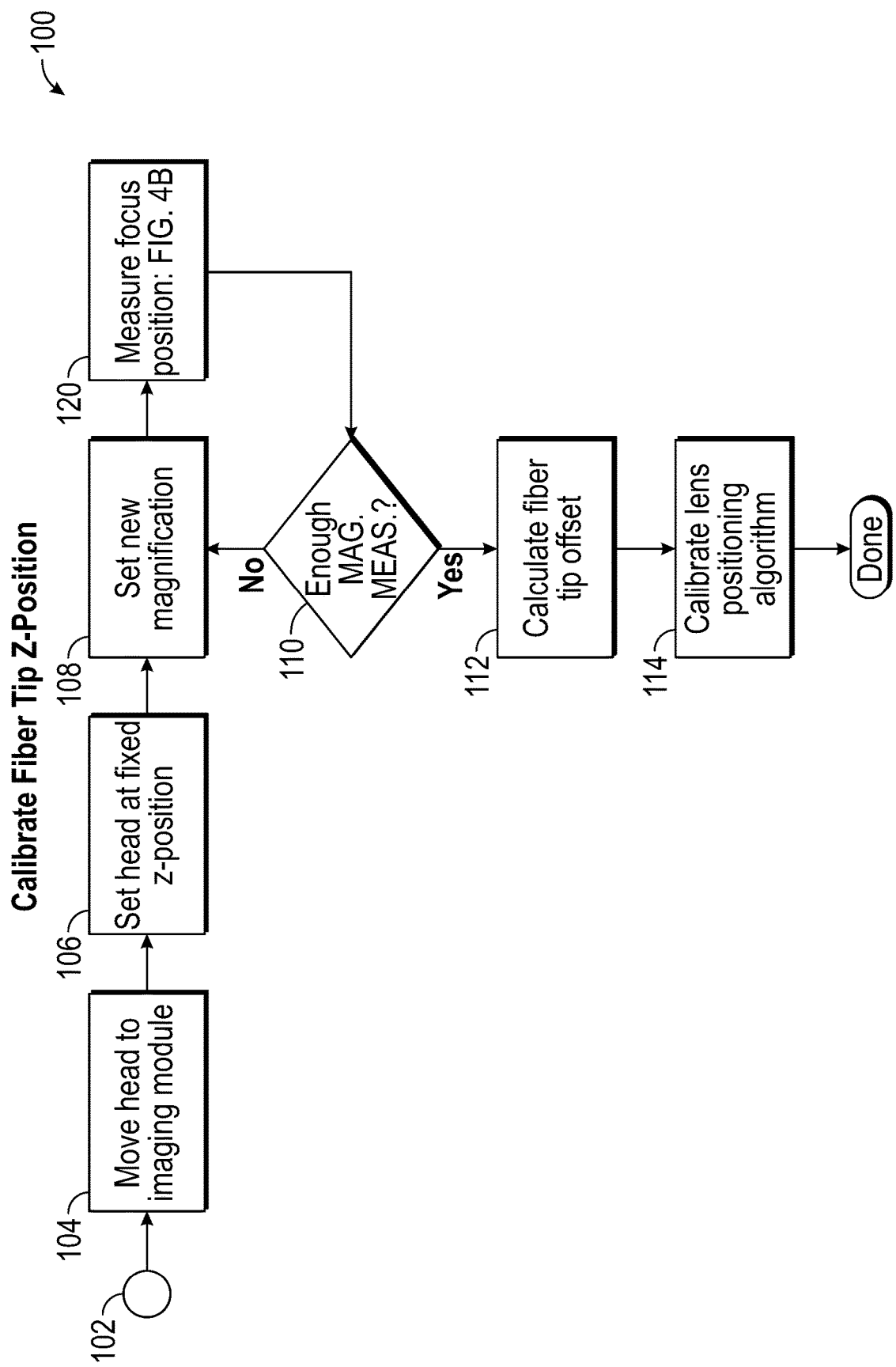
FIG. 4A illustrate a process of calibrating the Z-position of the fiber tip.

As shown in FIG. 4A, the procedure 100 can start when normal operation is stopped or suspended (Block 102). The start can be manually instructed or may be pre-scheduled. The laser head 30 is positioned relative to the imaging module 40 (Block 104), and the head 30 is set at a fixed Z-position (Block 106). The controller 50 then sets the optics 32, such as the lens optics 33a, at a new magnification (Block 108). A particular magnification may be beneficial for starting the process.

Figure 4B:
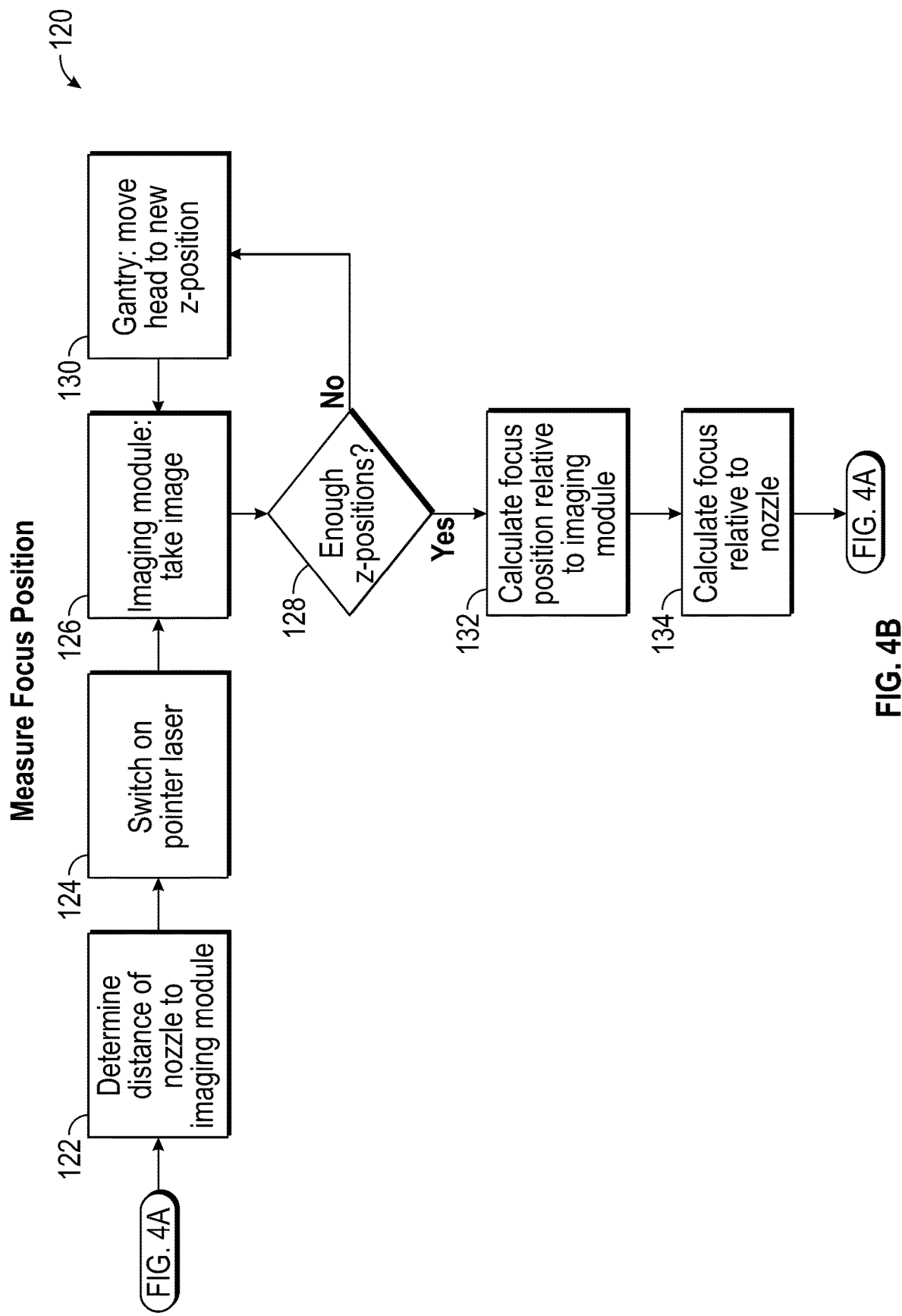
FIG. 4B illustrates a process of measuring the focus position of the laser beam used in the process of FIG. 4A.

Having set the magnification, the process 100 measures the focus position (Block 120) in a procedure shown in FIG. 4B. The procedure (Block 120) in FIG. 4B is executed for each of a plurality of different magnifications. The resulting measurements of Z-positions for different magnifications is then used to calculate the fiber tip offset in Block 112.

Looking at the procedure 120 in FIG. 4B, the controller 50 determines the distance of the nozzle 34 to the imaging module 40 using the sensor 36, the sensing element 46, and the distance measuring algorithm 57 (Block 122). The controller 50 switches on the laser so the head 30 emits the laser beam B used for calibration (Block 124). As noted, the low-power pointer laser source 24 is preferably used.

Using the imaging module 40, the controller 50 obtains an image of the laser beam B at the current Z-position of the head 30 (and the set magnification) (Block 126). Multiple measurements are obtained so numerical analysis can be performed to determine offsets, trends, curves, and the like for the calibration. For instance, the optical system of the head 30 is modelled in the software of the controller 50, and ray tracing in the software is used to do the corrections. The model is specific to the implementation of the optical system, numerical stability, etc.

Therefore, the controller 50 determines if enough measurements have been obtained for making the required numerical calculations (Decision 128). If more images are needed, the controller 50 moves the laser head 30 to a new Z-position relative to the imaging module 40 (Block 130) and obtains an image of laser beam at the Z-position (and the same set magnification) (Block 126). This process is repeated until a suitable number of images are taken.

Using the different images at the different Z-positions (and the same set magnification), the controller 50 calculates the external focus position of the laser head 30 relative to the imaging module 40 based on measurements of the beam diameter at the imaging module 40 (Block 132). The focus is calculated relative to the position on the head 30 used for measuring Z-position, which is typically the conductive sensor (36) on the head 30. Other measurements can be made. Other than measuring beam diameter, for example, the controller 50 can measure image sharpness using an autofocus algorithm. From the external focus position, the controller 50 then calculates an internal focus of the fiber tip 28 relative to the nozzle 34 of the head 30 (Block 134). In other words, the controller 50 can calculate the focus of the fiber tip 28 relative to the conductive sensor 36 used in determining the standoff position of the head 30.

Returning to the process 100 of FIG. 4A with this calculated focus at the set magnification, the controller 50 determines whether enough magnification measurements have be obtained (Block 110). As will be appreciated, the number of different magnification measurements required will depend on the numerical analysis performed and level of precision desired. If more measurements are required, the process 100 sets the optics 32, such as the lens optics 33a, at a new magnification (Block 108) and repeats the procedures in FIG. 4B to measure the focus position at the newly set magnification (Block 120: FIG. 4B). The steps are repeated until enough magnification measurements have been made (Yes at Decision 110).

Having enough measurements, the controller 50 calculates the Z-position offset of the fiber tip 28 (Block 112). The controller 50 then uses this information to recalibrate the optics algorithms (58) used in positioning the one or more lenses 32 in the head 30 (Block 114). In this way, the controller 50 can send Z-position instructions to the head actuators (62) to move the optics 32 to compensate for the fiber tip's Z-offset and improve the precision of the laser beam B.

If the laser head 30 includes a fiber actuator 68 configured to move the fiber tip 28 along the Z-axis, then the controller 50 in operable communication with the fiber actuator 68 can instruct the fiber actuator 68 to change position of the fiber tip 28 along the Z-axis based on a corrective position. Likewise, if the laser head 30 includes a deformable mirror 33b and at one mirror actuator 63, then the controller 50 can instruct the at least one mirror actuator 63 to deform the deformable mirror 33b based on a corrective position.

Another calibration procedure that can be implemented with the disclosed machine 10 involves calibrating the X-Y position of a fiber tip 28 on the laser head 30. The procedure 140 in FIG. 5 determines the alignment of a virtual fiber tip in at least one axis (e.g., X, Y directions) relative to the zoom optics 32 in the head 30. The controller 50 measures the x-y focus position of the laser beam B emitted from the head 30 at the same Z-position and different magnifications settings. The computerized-numerical controls of the controller 50 triggers the head 30 to be moved to a measurement Z-position, and the controller 50 switches on the laser (i.e., the pointer laser source 24). The controller 50 then coordinates the magnification and position settings of the head 30 along with the image acquisition by the imaging module 40.

As noted herein, the head 30 may or may not have an actuator (68; FIG. 3) to adjust alignment of fiber tip 28 on the head 30 in the at least one axis (e.g., X-Y directions). If the head 30 includes such an automated actuator (68), then automatic adjustments made. If not automated, then corrections for manual correction can be output so a user can make manual adjustments to a manual actuator (68).

If available, other algorithms can be adjusted to compensate for the offset to improve the precision of the laser beam during operations. For example, the head 30 may include a lens optic 33a and an actuator 62 able to move the lens optic 33a in all dimensions, including in the Z-axis to allow for adjustment in magnification requested by the machine, and to allow for adjustments in X-Y axes to compensate for corrections in tolerances. Accordingly, the controller 50 can implement the calculated correction in an algorithm used to move the at least one lens optic 33a in an X-Y direction in the laser head using the at least one lens actuator 62. Furthermore, if the laser head 30 includes a tiltable mirror 33b and at one mirror actuator 63, then the controller 50 can implement the calculated correction in an algorithm used to move the at least one tiltable mirror 33b.

Figure 5:
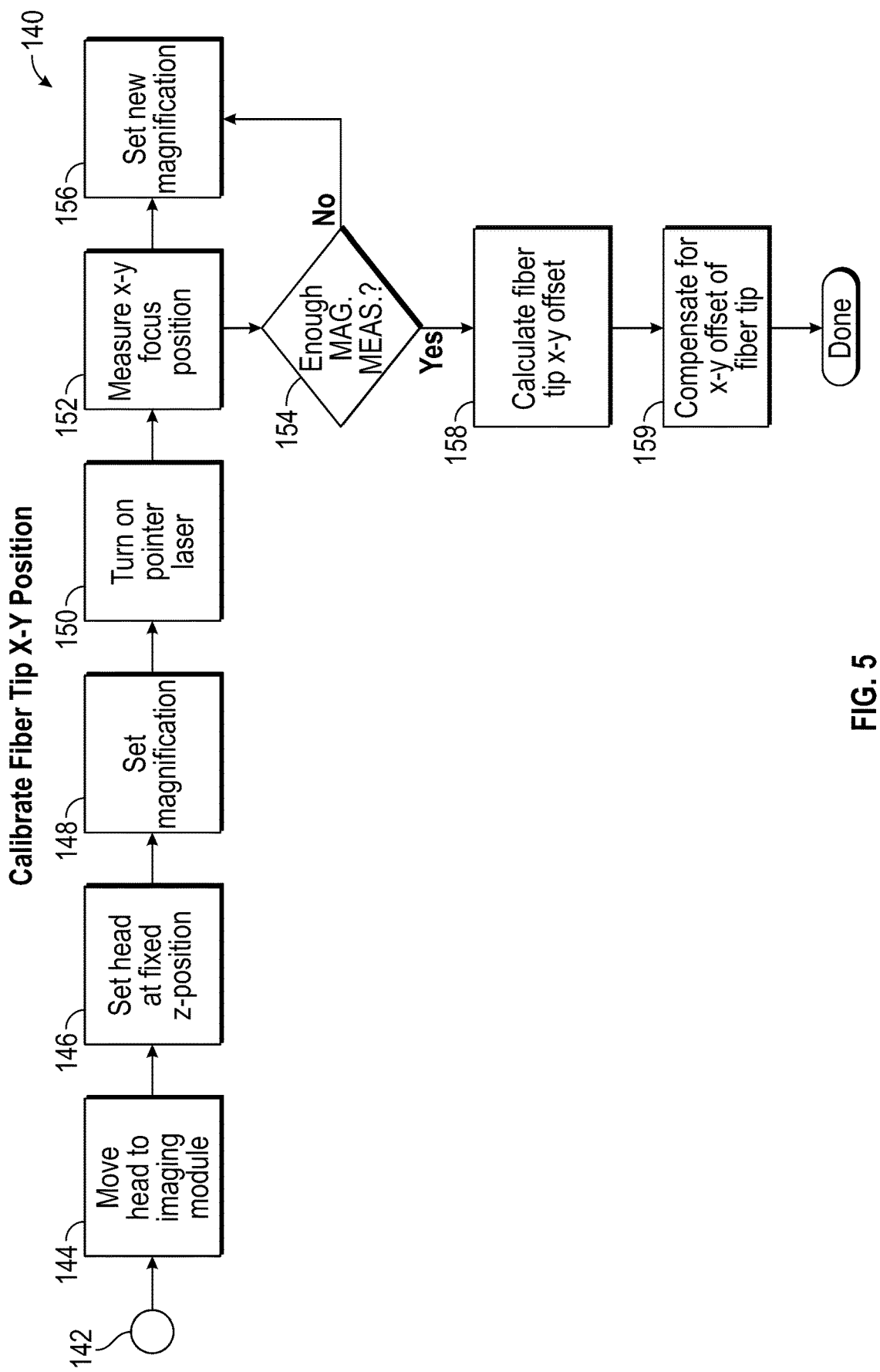
FIG. 5 illustrates a process of calibrating the position of a fiber tip on the laser head.

As shown in FIG. 5, the procedure 140 can start when normal operation is stopped or suspended (Block 142). The start can be manually instructed or may be pre-scheduled. The laser head 30 is positioned relative to the imaging module 40 (Block 144). The controller 50 sets the head 30 at a fixed Z-position (Block 146) and sets the magnification of the optics 32 in the laser head 30 (Block 148). The controller 50 switches on the laser so the head 30 emits the laser beam B used for calibration (Block 150). As noted, the low-power pointer laser is preferably used.

The controller 50 obtains an image of the laser beam B at the fixed Z-position and current magnification and measures the focus position (Block 152). Multiple measurements are obtained so numerical analysis can be performed to determine offsets, trends, curves, and the like for the calibration. Therefore, the controller 50 determines if enough measurements have been obtained for making the required numerical calculations (Decision 154).

To obtain additional images, the controller 50 sets the optics 32 in the laser head 30 to a new magnification (Block 156). The controller 50 obtains an image of the laser beam B at the Z-position and current magnification and measures the X-Y focus position (Block 152). This process is repeated until a suitable number of images are taken.

Using the different measured focus positions of the images at the fixed Z-position and different magnifications, the controller 50 calculates an XY-offset of the fiber tip 28 in the laser head 30 (Block 158). This offset is based on misalignment, differences in tolerance, characteristics of the fiber tip 28, and the like relative to the magnification optics 32 of the head 30. At this point, the controller 50 than compensates for the XY-offset of the fiber tip 28 (Block 159).

In general, the XY-offset of the fiber tip 28 can be compensated by an XY-movement of the fiber tip 28 and/or by an XY-movement of at least one lens in the optics 32. For example, should the head 30 include an actuator (68; FIG. 3) for adjusting the X-Y position of the fiber tip 28, the controller 50 can send an instruction for manual or automatic adjustment of the actuator (68) to account for the XY-offset of the fiber tip 28. Likewise, the controller 50 can send an instruction to adjust the XY-position of at least one lens of the head's optics 32 to account for the XY-offset of the fiber tip 28. In principle, adjustments may also be made by tilting of mirrors in the head's optics 32, but this may not be suited for a material processing head as discussed here.

As can be seen, the calibration procedures can measure tolerances and difference in the fiber tip 28 that may deviate from what is stored in the control algorithms 56, 58 of the controller 20 that model the optics 32 of the head 30. Configuration during manufacture of the head 30 may change over time during use of the machine 10. In many instances, tolerances associated with the laser light cable 25, the connector 26, the fiber tip 28, and the like cannot be controlled with sufficient precision by design alone. To be clear, the built-in optics algorithm 58 that controls the normal actuators may only be able to compensate for a subset of tolerances. For some tolerances, the optics algorithms 58 in the controller 50 can account for differences in tolerance by adjusting position, zoom, and the like during operation. As noted, the device's positioning algorithms 56 are used for controlling the head's position in space. In general, these positioning algorithms 56 may not compensate for tolerances of the fiber tip 28 or tolerances within the head 30. Instead, the head's optic algorithms 58 can account for the differences in these tolerances. The controller 50 use the calibration procedure 120 to calculate an offset of the fiber tip 28 at its actual position relative to its expected position so the controller 50 can correct the Z-position and magnification of the head's optics algorithms 58 to account for the offset.

Yet another calibration procedure that can be implemented with the disclosed machine 10 involves centering focus of the laser beam in the nozzle 34 of the laser head 30. The calibration procedure 160 in FIG. 6 calibrates the position of the focus spot of the laser beam B in at least one axis (e.g., X-Y axes) relative to the center of the nozzle 34. The laser beam B from the head 30 is preferably centered in the nozzle 34 for proper operation. Using the pointer laser, for example, the controller 50 magnifies the laser beam B away from the center of the nozzle 34, and the controller 50 images the nozzle 34 with the imaging module 40 and calculates the nozzle's position from this. Focusing the beam B to the nozzle plane and measuring its centroid gives an offset of the beam B relative to the nozzle 34. The offset of the nozzle 34 relative to the beam B can be adjusted manually or automatically. As noted, the head 30 may include an actuator (64: FIG. 3) to adjust the nozzle 34 on the head 30 so the nozzle 34 can be automatically adjusted for the detected offset. Alternatively, output can be given so manual adjustments to the nozzle's position can be made on the head 30.

Figure 6:
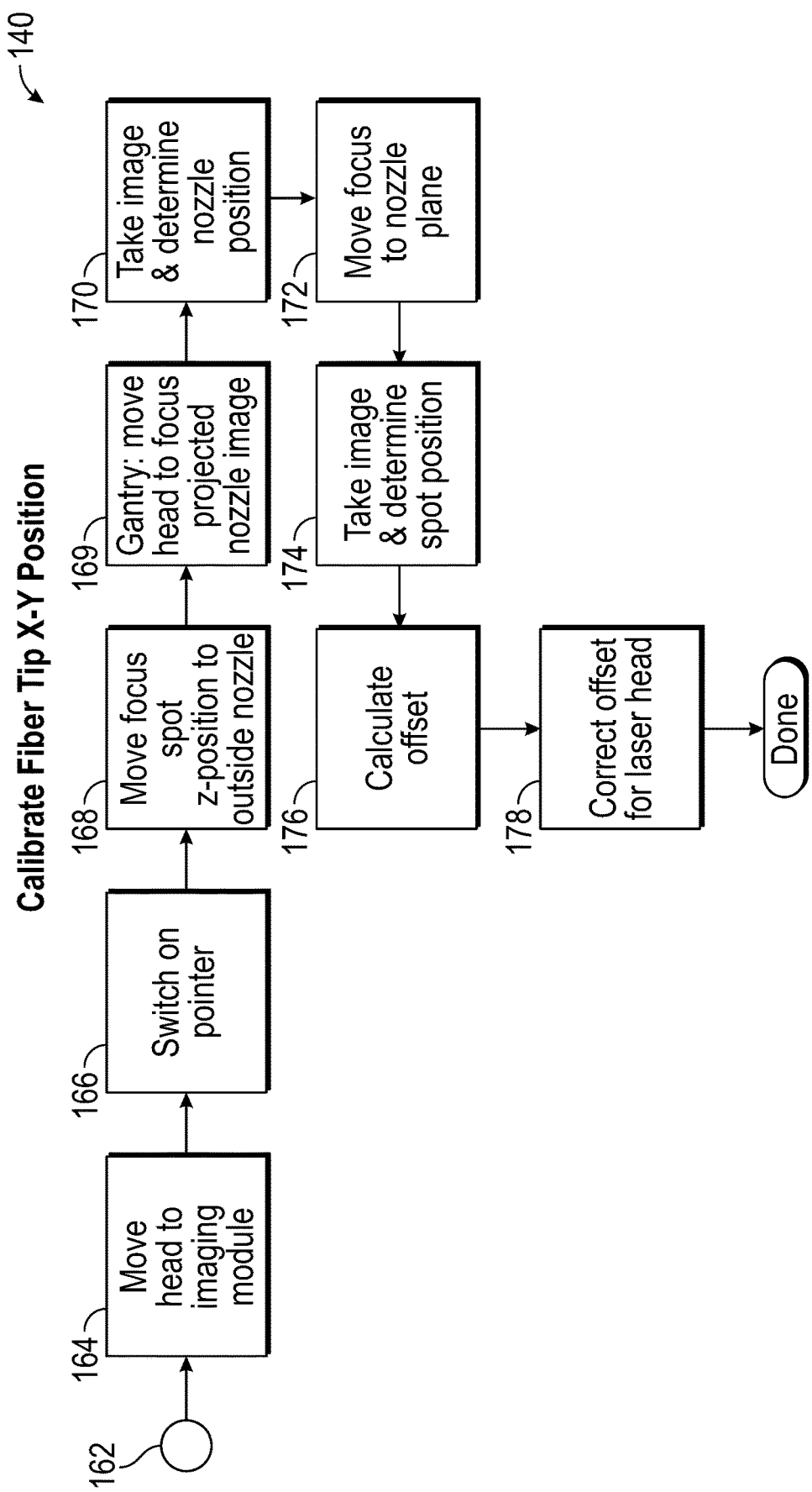
FIG. 6 illustrates a process of centering focus of the laser beam in the nozzle of the laser head.

As shown in FIG. 6, the procedure 160 can start when normal operation is stopped or suspended (Block 162). The start can be manually instructed or may be pre-scheduled. The laser head 30 is positioned relative to the imaging module 40 (Block 164). The controller 50 sets the head 30 at a fixed Z-position that is conducive to the measurements to be made.

The control switches on the laser so the head emits the laser beam used for calibration (Block 166). As noted, the low-power pointer laser 24 is preferably used. The controller 50 moves the Z-position of the laser's focus spot to outside the nozzle 34 by controlling the optics 32 in the head 30 (Block 168). Then, the controller 50 uses the positioning device 20 (e.g., gantry) to move the head 30 along the Z-axis to focus the projected image of the nozzle 34 on the imaging module 40 (Block 169). Therefore, in Block 168, the controller 50 uses the built-in lens actuators 62 to move the focus position of the laser beam B well outside of the nozzle 34 so that the hole of the nozzle 34 is then fairly homogeneously illuminated by the laser beam B. Essentially, the hole in the nozzle 34 is projected as a bright filled circle so the center can be determined. Then, moving the head 30 along the Z-axis in Block 169 to focus the projected image of the nozzle 34 on the imaging module 40 sharpens the circular projection. In this state, the controller 50 obtains an image of the nozzle and determines the nozzle's position (Block 170). The controller 50 then moves focus of the laser beam B to the nozzle's plane by controlling the optics 32 in the laser head 30 (Block 172). The controller 50 obtains a new image of the laser beam B at the Z-position and current focus and determines the spot position (Block 174).

Using the measured nozzle and spots positions from the images at the fixed Z-position, the controller 50 calculates an offset of the nozzle 34 on the laser head 30 (Block 176). This offset is based on misalignment, differences in tolerance, characteristics of the nozzle 34, and the like of the nozzle 34 relative to the optics 32 of the head 30. The controller 50 then corrects for the offset (Block 178). Should the head 30 include an actuator (64; FIG. 3) for adjusting the nozzle 34, for example, the controller 50 can send an instruction for manual or automatic adjustment of the actuator (64).

Yet another procedure that can be implemented with the disclosed machine 10 involves diagnosing the optics 32 in the head 30. This procedure 180 in FIG. 7 uses the head's integrated positioning actuators 60, 62 associated with the control algorithms 56, 58 and uses the machine's Z-axis control to image the lens surfaces onto the sensing element 42 of the imaging module 40. This can be used to check for anomalies (damages, changes, etc.) to the surfaces of the lenses of the optics 32. The optics 32 in head 30 and the positioning device 20 (e.g., gantry) are moved to bring surfaces of the optics 32 into focus on the sensing element 42, and the focused image of the optics' surface can then be assessed for anomalies.

Figure 7:
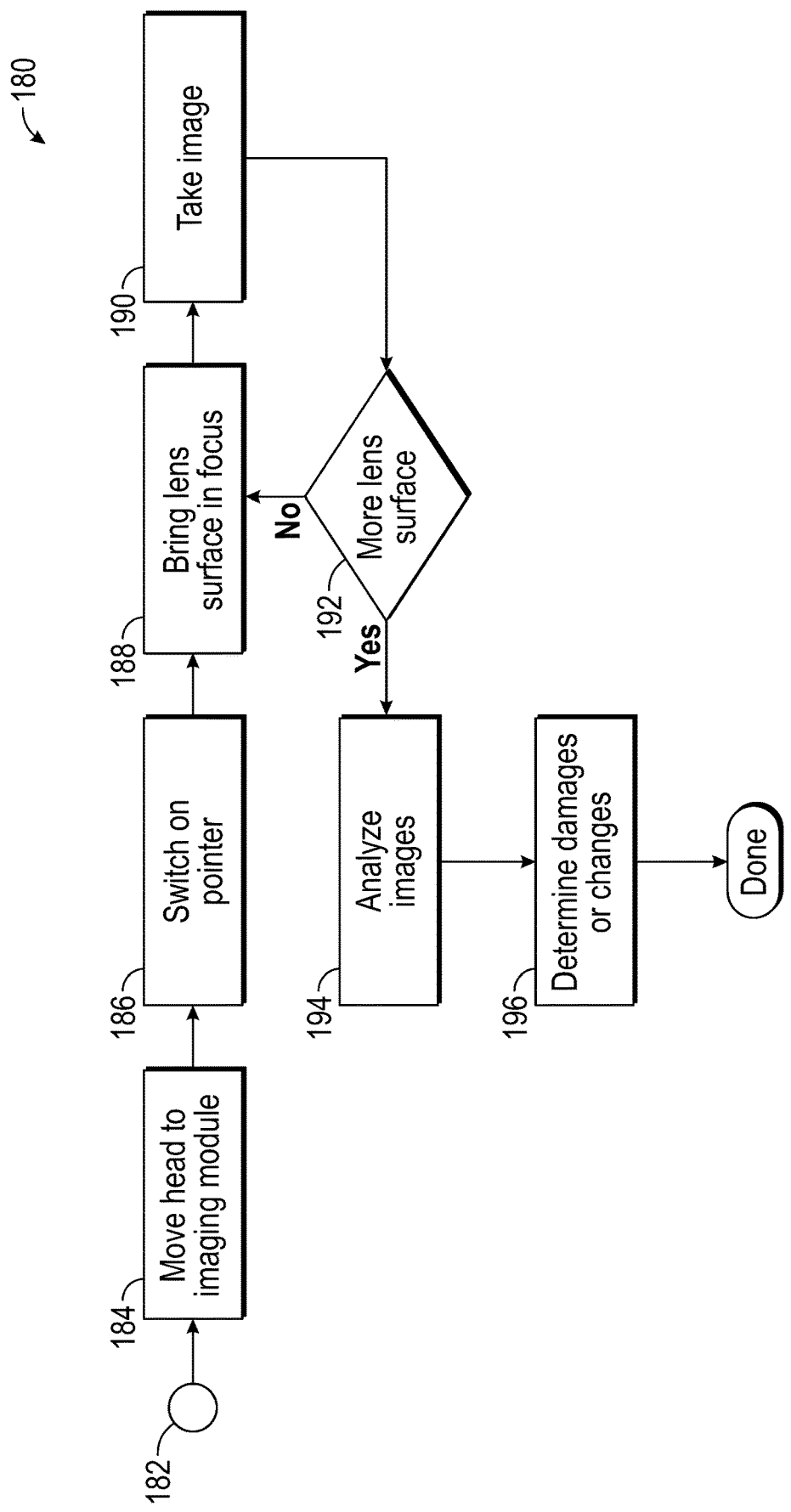
FIG. 7 illustrates a process of imaging surfaces of the lenses to detect anomalies.

As shown in FIG. 7, the procedure 180 can start when normal operation is stopped or suspended (Block 182). The start can be manually instructed or may be pre-scheduled. The laser head 30 is positioned relative to the imaging module 40 (Block 184).

The control switches on the laser so the head emits the laser beam used for calibration (Block 186). As noted, the low-power pointer laser is preferably used. The controller 50 uses the integrated positioning actuators 60, 62 associated with the control algorithms 56, 58 and uses the machine's Z-axis control to image a lens surface onto the sensing element 42 of the imaging module 40 (Block 188). The controller 50 obtains an image of the lens surface using the imaging module 40 (Block 180). If additional lens surfaces are present (Decision 182), the process repeats (Block 188, 190). The controller 50 then analyzes the images of the lens surface(s) using image processing techniques for detecting anomalies, differences, and the like in the lens surface(s) (Block 194). Based on the analysis, the controller 50 can determine that a lens surface is damaged or has changes indicating that the lens needs to be replaced (Block 196). Information about the anomaly associated with the lens can then be output so operations can be modified or a replacement lens can be installed.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An apparatus used for calibrating a laser processing machine that has a laser source, a laser head, at least one optical component associated with the laser head, and machine actuators that include at least one device actuator configured to position the laser head and at least one head actuator configured to adjust the at least one optical component, the apparatus comprising:
   an imaging sensor configured to image an optical beam of the laser source from the laser head; and
   a controller in operable communication with the imaging sensor and with at least one of the machine actuators, the controller being configured to:
   control output of the optical beam from the laser head;
   control the at least one machine actuator to position the laser head and/or the at least one optical component at a plurality of measurement positions relative to the imaging sensor;
   obtain a plurality of images of the optical beam at the plurality of measurement positions from the imaging sensor;
   measure at least one offset of the at least one optical component of the laser head based on the obtained images; and
   output at least one adjustment of the laser processing machine corrective of the at least one offset.

2. The apparatus of claim 1, wherein to control the output of the optical beam from the laser head, the controller is configured to switch operation of the laser processing machine to a low power pointer laser of the laser source.

3. The apparatus of claim 1 such that the at least one optical component is at least one lens optic and the at least one head actuator is at least one lens actuator of the head configured to change magnification of the optical beam by the at least one lens optic, wherein to control the at least one machine actuator at the plurality of measurement positions relative to the imaging sensor, the controller is configured to move the laser head using the at least one device actuator to change the position of the laser head along a Z-axis relative to the imaging sensor and is configured to change the magnification of the optical beam by the at least one lens optic using the at least one lens actuator.

4. The apparatus of claim 3,
   wherein to obtain the plurality of images of the optical beam at the plurality of measurement positions from the imaging sensor, the controller is configured to obtain, from the imaging sensor, the images of the optical beam at a plurality of the changed magnifications and at a plurality of the changed positions;

wherein the at least one offset of the at least one optical component of the laser head comprises a focus position of the optical beam; and wherein the at least one adjustment of the laser processing machine comprises a corrective position of the at least one lens optic in the laser head in the Z-axis calculated based on a comparison of the measured focus position to an expected focus position.

5. The apparatus of claim 4, wherein the controller is in operable communication with the at least one lens actuator; and wherein to output the corrective position, the controller is configured to instruct the at least one lens actuator to position the at least one lens optic based on the corrective position.

6. The apparatus of claim 4, wherein the apparatus comprises at least one fiber actuator arranged with the fiber tip on the laser head; wherein the controller is in operable communication with the at least one fiber actuator; and wherein to output the corrective position, the controller is configured to instruct the at least one fiber actuator to change position of the fiber tip along the Z-axis based on the corrective position; and/or wherein the apparatus comprises at least one mirror actuator configured to deform a deformable mirror in the laser head; wherein the controller is in operable communication with the at least one mirror actuator; and wherein to output the corrective position, the controller is configured to instruct the at least one mirror actuator to deform the deformable mirror based on the corrective position.

7. The apparatus of claim 1 such that the at least one optical component is at least one lens optic and the at least one head actuator is at least one lens actuator of the head configured to change magnification of the optical beam by the at least one lens optic, wherein to control the at least one machine actuator at the plurality of measurement positions relative to the imaging sensor, the controller is configured to move the at least one lens optic of the laser head using the at least one lens actuator to change the magnification of the laser head.

8. The apparatus of claim 7, wherein to obtain the plurality of images of the optical beam at the plurality of measurement positions from the imaging sensor, the controller is configured to obtain from the imaging sensor the images of the optical beam at a plurality of the changed magnifications;

wherein the at least one offset of the at least one optical component of the laser head comprises an X-Y focus position of the optical beam; and wherein the at least one adjustment of the laser processing machine comprises a correction based on a comparison of the measured X-Y focus position to an expected X-Y focus position.

9. The apparatus of claim 8, wherein the controller is configured to:

implement the calculated correction in an algorithm used to move the at least one lens optic in an X-Y direction in the laser head using the at least one lens actuator; and/or implement the calculated correction in an algorithm used to move a tiltable mirror in the laser head using the at least one head actuator.

10. The apparatus of claim 8, wherein the apparatus further comprises a fiber actuator arranged with the fiber tip on the laser head, the fiber actuator being in operable communication with the controller and being actuatable to position the fiber tip, wherein the controller is configured to instruct the fiber actuator to position the fiber tip based on the calculated correction.

11. The apparatus of claim 1 such that the at least one optical component is at least one lens optic, the head has a nozzle with an opening, and the at least one head actuator is at least one lens actuator configured to position the at least one lens optic of the laser head, wherein to control the at least one machine actuator at the plurality of measurement positions relative to the imaging sensor, the controller is configured to move the at least one lens optic of the laser head using the at least one lens actuator to change focus position of the optical beam along a Z-axis in the opening of the nozzle relative to the imaging sensor.

12. The apparatus of claim 11, wherein to obtain the plurality of images of the optical beam at the plurality of measurement positions from the imaging sensor, the controller is configured to obtain from the imaging sensor the images of the optical beam at a plurality of the changed focus positions;

wherein the at least one offset of the at least one optical component of the laser head comprises an X-Y offset of the nozzle on the laser head; and wherein the at least one adjustment of the laser processing machine comprises a correction based on X-Y offset of the nozzle.

13. The apparatus of claim 12, wherein the apparatus further comprises a nozzle actuator arranged with the nozzle on the laser head, the nozzle actuator being in operable communication with the controller and being actuatable to position the nozzle, wherein to output the corrective displacement, the controller is configured to instruct the nozzle actuator to position the nozzle based on the correction.

14. The apparatus of claim 1, such that the at least one optical component is a fiber tip of the laser head, wherein to measure the at least one offset of the fiber tip based on the obtained images, the controller is configured to calculate alignment of the fiber tip in at least one axis relative to the laser head; and calculate a corrective displacement of the fiber tip on the laser head in the at least one axis based on the calculated alignment.

15. The apparatus of claim 14, wherein the apparatus further comprises a fiber actuator arranged with the fiber tip on the laser head, the fiber actuator being in operable communication with the controller and being actuatable to position the fiber tip, wherein to output the corrective displacement, the controller is configured to instruct the actuator to position the fiber tip based on the corrective displacement.

16. The apparatus of claim 1, such that the at least one optical component is a fiber tip of the laser head, wherein to measure the at least one offset of the fiber tip based on the obtained images, the controller is configured to calculate alignment of the fiber tip in at least one axis relative to the laser head; and calculate a corrective positioning of at least one lens, and least one mirror, or both in the laser head based on the calculated alignment.

17. The apparatus of claim 16 such that the at least one optical component is at least one lens optic of the laser head, wherein the apparatus further comprises a lens actuator arranged with the at least one lens optic on the laser head, the lens actuator being in operable communication with the controller and being actuatable to position the at least one lens optic, wherein to output the corrective positioning, the controller is configured to instruct the lens actuator to position the at least one lens optic based on the corrective positioning.

18. The apparatus of claim 1, such that the at least one optical component is a nozzle of the laser head, wherein to measure the at least one offset of the nozzle based on the obtained images, the controller is configured to calculate centering of the optical beam in the nozzle of the laser head; and calculate a corrective displacement of the nozzle on the laser head based on the calculated centering.

19. The apparatus of claim 18, wherein the apparatus further comprises a nozzle actuator arranged with the nozzle on the laser head, the nozzle actuator being in operable communication with the controller and being actuatable to position the nozzle, wherein to output the corrective displacement, the controller is configured to instruct the actuator to position the nozzle based on the corrective displacement.

20. The apparatus of claim 1, the at least one optical component including at least one lens optic, wherein the controller is further configured to:
  bring a surface of at least one lens optic of the laser head in focus onto the imaging sensor using the at least one machine actuator;
  detect an anomaly for the surface of the at least one lens; and
  output the detected anomaly.

21. A system for calibrating a laser processing machine that has a laser source and at least one device actuator, the system comprising:
  a laser head being movable by the at least one device actuator and being configured to emit an optical beam of the laser source, the laser head having at least one head actuator and having at least one optical component, the at least one head actuator being configured to adjust the at least one optical component; and
  an apparatus having an imaging sensor and a controller according to claim 1 for calibrating the laser processing machine.

22. A laser processing machine comprising:
  a laser source having a high-power processing laser and a low power pointer laser;
  at least one device actuator;
  a laser head being movable by the at least one device actuator and being configured to emit an optical beam of the laser source;
  at least one optical component associated with the laser head;
  at least one head actuator associated with the laser head and being configured to adjust the at least one optical component; and
  an apparatus having an imaging sensor and a controller according to claim 1 for calibrating the laser processing machine.

23. The machine of claim 22, wherein the laser processing machine is a flatbed laser cutting machine.

* * * * *